Patented July 29, 1952

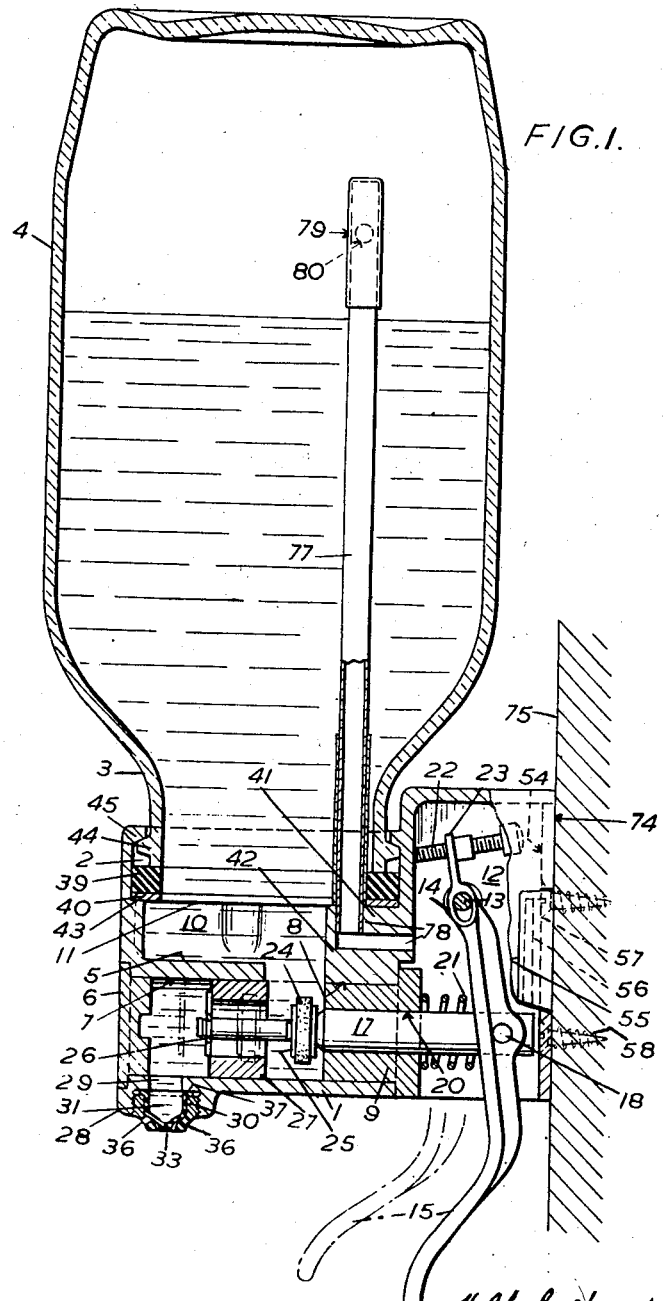

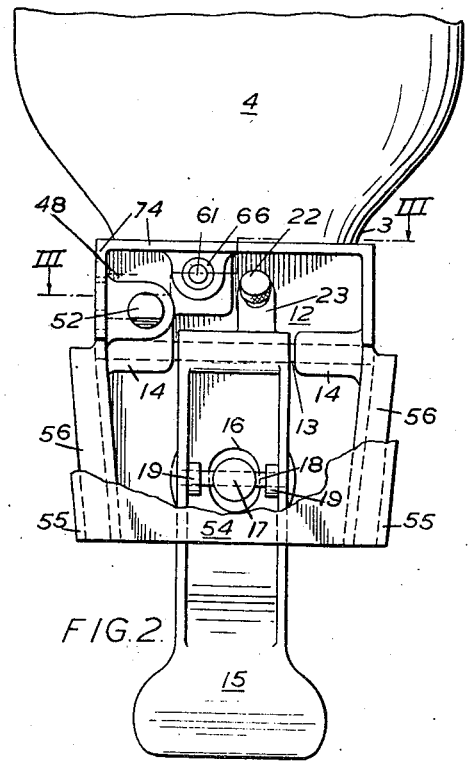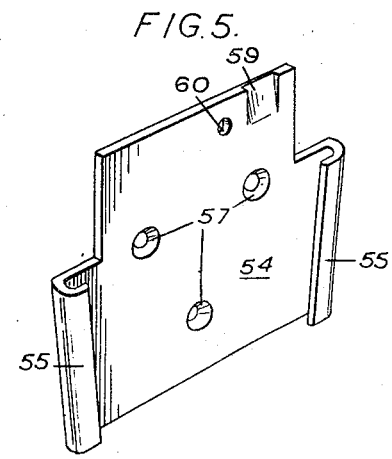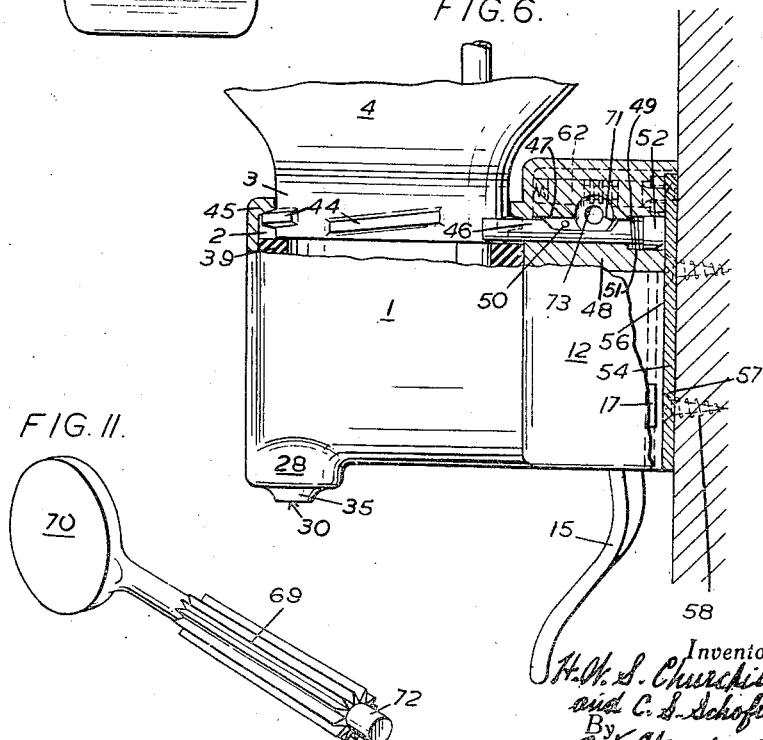

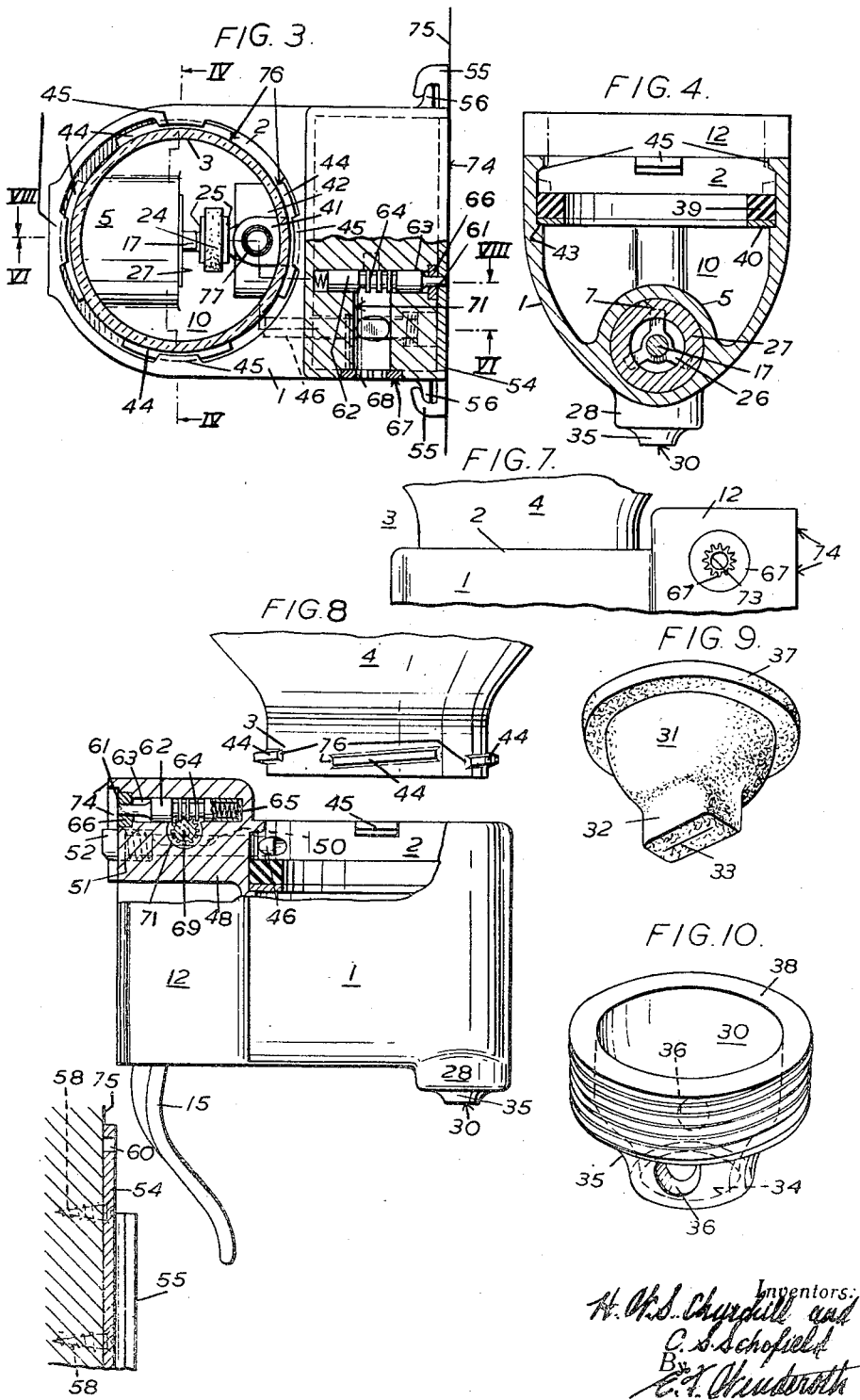

2,605,021

UNITED STATES PATENT OFFICE 2,605,021

DISPENSER FOR AN INVERTED CONTAINER WITH MEANS FOR LOCKING SAID CONTAINER THERETO AND A SELF-CLOSING OUTLET ELEMENT

Henry Winston Spencer Churchill and Cecil Strathmore Schofield, London, England

Application July 14, 1949, Serial No. 104,756
In Great Britain July 16, 1948

6 Claims. (Cl. 222—153)

This invention relates to apparatus for dispensing paste and liquid substances, such as soap and other detergent or toilet or medicinal preparations, foods and the like, in different grades of viscosity.

It is an object of the invention to provide a dispenser constructed so that the substance dispensed is delivered into the upturned palm of a hand which, by means of its hooked fingers, is employed to effect the dispensing operation.

Another object of the invention is to provide a dispensing apparatus in which the receptacle in which a paste or liquid substance is stored while awaiting dispensing is constituted by a non-returnable or discardable container in which the substance is normally marketed, the container being detachably mounted on the apparatus.

Another object of the invention is to provide a dispensing apparatus with a detachable storage receptacle, in which the body of the apparatus is adapted to be applied, when inverted, to the upwardly directed open mouth of a charged storage receptacle, so that the body of the apparatus can be attached to the storage receptacle without spilling of its contents; the body and attached receptacle being then turned over as a whole to dispose the body in its normal position, with the receptacle thereon inverted so that the contents thereof can flow into the body for dispensing.

It is another object of the invention to provide such an apparatus which is adapted to co-operate with interchangeable receptacles, for instance, non-returnable or discardable marketing containers, of the same capacity or of different holding capacities.

A further object of the invention is to provide apparatus adapted to receive interchangeable storage receptacles, in which provision is made for adjusting the amount or volume of substance dispensed at each operation of the apparatus, irrespective of the holding capacity of the associated storage receptacle.

A still further object of the invention is to provide apparatus constructed with means for preadjusting the amount or volume of substances dispensed at each operation of the apparatus, the said adjustment means being inaccessible to unauthorised persons while the apparatus is in a condition and position of use.

Another object of the invention is to provide a dispensing apparatus constructed so as to facilitate its attachment to a wall or other surface.

It is another object of the invention to provide apparatus suitable for dispensing liquids, such as liquid soap, in which is employed a discharge orifice which is non-leaking when closed.

A further object of the invention is to provide apparatus suitable for dispensing pastes, such as soap paste, in which use is made of a discharge orifice which cannot become clogged by reason of paste setting hard in the discharge orifice.

Another object of the invention is to provide means which ensure that at the close of a period of use none of the substance being dispensed remains within the discharge orifice.

A still further object of the invention is to provide a dispensing apparatus in which a storage receptacle is detachably mounted on the body of the apparatus, and the body is removably mounted on a wall bracket or other supporting means, provision being made for locking the receptacle to the body and the body to the wall bracket or the like.

The accompanying drawings illustrate, by way of example, an embodiment of the invention in the form of a dispensing apparatus primarily intended for dispensing soap paste.

In the dispenser illustrated in the accompanying drawings the detachable receptacle in which the soap paste is stored ready for dispensing is in the form of a discardable container which is supported in an inverted position on a body part in which is housed exteriorly operable charge-apportioning means, the body part being attachable to a wall bracket.

In the drawings:

Figure 1 is a longitudinal vertical cross section through the dispenser, showing the detachable storage receptacle mounted in an inverted position on the body of the dispenser which in turn is removably supported by the wall bracket, Figure 2 is a rear view of the dispenser, showing the wall bracket broken away to reveal component parts which are normally hidden from view, Figure 3 is a plan view on line III, III of Figure 2, Figure 4 is a cross sectional elevation on line IV, IV of Figure 3, Figure 5 is a pictorial view of the wall bracket, Figure 6 is a part-sectional side elevation of the dispenser, with the component parts in the same positions as shown in Figure 1, the section being taken along line VI, VI of Figure 3, Figure 7 is a fragmentary side view showing in outside elevation the part shown in section in Figure 6, Figure 8 is a part-sectional side view showing the container detached from the body part and the body part removed from the wall bracket, the section being taken along line VIII, VIII of Figure 3, Figures 9 and 10 are respectively pictorial views of the elastic nipple and the rigid nozzle which together form the self-sealing discharge valve of the dispenser, and Figure 11 is a pictorial view of a key for locking the body part to the wall bracket.

The soap paste dispenser illustrated in the accompanying drawings has a body portion 1 which is provided in its upper part with an upwardly-opening socket 2 which is adapted to receive the neck 3 of a discardable soap paste container 4 made of moulded paper, pulp, metal, glass or other suitable material. The container 4 is supported in the inverted position when the body 1 is mounted ready for use, as shown in Figure 1. In the lower part of the body 1 a horizontally disposed cylinder 5 is provided which extends from the front rearwards, the front end of the cylinder 5 being closed-in permanently by an end plate 6. To facilitate machining of the bore 7 of the cylinder the rear of the body 1 is made with a bore 8 which is aligned with the cylinder bore 7 and is closed by a flanged bush 9. The open rear end of the cylinder 5 communicates freely with the main chamber 10 which leads directly through a wide inlet opening 11 to the interior of the socket 2 which is fashioned, as described later, to engage the neck 3 of the soap paste container 4.

Behind the body chamber 10 and the socket 3 surmounting said chamber the body 1 is formed with an integral housing 12, open at the back and at the bottom. Transversely within the upper part of this housing 12 a pin 13 is supported horizontally in a pair of lugs 14 (see Figure 2) and upon the pin 13 is freely suspended, by its upper end, an operating lever 15. The lower part of the lever 15 extends through the open bottom of the housing 12 so as to project below the body 1. Intermediately of its length the operating lever 15 is provided with an aperture 16 for the passage therethrough of the rear end of a piston rod 17, to which the lever 15 is pivotally connected by means of a cross pin 18 supported in a pair of bosses 19 on the lever 15. Part of the rear half of the rod 17 is slidably supported in the bore 20 of the flanged bush 9 and a coiled compression spring 21, encircling the rod 17, is interposed between the flange of bush 9 and the inside face of the lever 15 so that the lever 15 is normally forced to the limit of its stroke rearwards, as indicated in full lines in Figure 1. The extent of forward swing of the operating lever 15 is fixed, being determined by the maximum compression of the spring 21. The extent of rearward swing of the lever 15, however, is variable, being determined by the setting of an adjusting screw 22 mounted on a tongue 23 on the lever 15. The tongue 23 extends beyond the point of pivotal suspension of the lever 15, said adjusting screw 22 being adapted to contact with the interior surface of the housing 12 to arrest the swinging lever 15. Hence the length of stroke of the piston rod 17 may be varied, but any variation is made by regulating the position of rest of the lever 15, so that the operating lever 15 always swings to a constant forward position, as indicated by chain-dotted lines in Figure 1.

On the front half of the piston rod 17 two elements of a piston assembly are secured, namely, a cut-off closure 24, preferably of a resilient nature, such as a disc of felt, leather or a suitable rubber, in which case the cut-off closure 24 is clamped between a pair of stiff washers 25 fixed along the front half of the piston rod 17, and a spider plate 26, or equivalent perforated element, secured on the forward extremity of the piston rod 17. The cut-off closure 24 and the spider plate 26 are adapted to co-operate with the opposite ends of a thick ring 27 which is free to slide within the bore 7 of cylinder 5.

On the underside of the front end of the body 1 an internally screwed boss 28 is provided, from the top of which an outlet port 29 leads into the front end of the cylinder 5. Into the boss 28 is screwed a nozzle 30 of metal or other suitable rigid material in which is nested a moulded rubber nipple 31. The nipple 31 has a flat-sided tip 32 (see Figure 9) pierced by a slit 33 which constitutes a discharge orifice and which because of the inherent elasticity of the rubber of which the nipple is made, is normally closed, that is, the discharge orifice is self-sealing. The tip 32 is received within the centrally disposed circular opening 34 of the hollow nose 35 of a nozzle 30 (see Figure 10), the circular shape of the opening 34 permitting the flat-sided, slit nipple tip 32 to stretch to a limited extent to allow discharge of the paste or liquid being dispensed. Openings 36 are provided in the wall of the nozzle noze 35 for the reception of a tool to facilitate assembly of the nozzle 30. The nipple 31 has a flange 37 which is clamped between the top face 38 of the nozzle 30 and the roof of the hollow boss 28.

The rim of the neck 3 of the inverted bottle 4 is clamped down on to a rubber gasket 39 which is backed by a metal or other substantially rigid washer 40. The washer 40 is seated at one point on the top of a small boss 41, surmounting a larger boss 42 having the bore 8 in which the flanged bush 9 is mounted. The washer 40 is also supported by a ledge 43 encircling the inlet 11 to the body chamber 10. The rubber gasket 39 and washer 40 are made to fit snugly within the socket 2, but they are not secured in position and thus can be readily removed for purposes of cleaning or replacement. The clamping action is effected by the engagement of a number of circumferentially-spaced inclined lugs 44 on the bottle neck 3 with a complementary set of lever lugs 45 within the socket 2. The circumferential spacing of socket lugs 45 is such as to admit freely of the passage therebetween of the bottle neck lugs 44, partial rotation of the body 1 relatively to the bottle 4 causing the lugs 44, 45 to engage. The inclination of the lugs 44 causes the bottle neck 3 to be forced hard against and so compress the rubber gasket 39, thereby providing a liquid-tight seal between the bottle 4 and the body 1 of the dispensing apparatus.

Because of the manufacturing tolerance which must be allowed for in the position of the bottle neck lugs 44 in relation to the rim of the bottle neck 3 it is important to be able to raise or lower the surface of the rubber gasket 39 with which the bottle neck rim contacts and the necessary adjustment can be readily effected by selecting gaskets 39 and/or washers 40 having suitable thicknesses, bearing in mind that the angle of inclination of the bottle neck lugs 44 largely determines the degree of compression required in the rubber gasket 39. In order to increase the range of adjustment the ledge 43 may be constituted by the outer end of one of a series of interchangeable ring-like liners. If desired, an interchangeable slip-in liner of this character may be securable within a plain cylindrical socket by fixing means which are inaccessible when the dispenser is mounted in a position of use, the liner being formed with lugs similar to the socket lugs 45 and with a ledge similar to ledge 43 for supporting a rubber gasket 39 with or without a backing washer 40.

For the purpose of preventing unauthorised removal of the bottle 4 from the body 1 the bottle 4 is locked to the body 1, and this is done in the embodiment illustrated in the drawings, by slidably mounting a bolt 46 in a through hole 47 provided in an integral bottle locking block 48 formed in the upper part of the housing 12 in such a position that one end of said bolt 46 can project into the socket 2 of the body 1 in line with the bottle neck lugs 44 so that when thus projecting little or no reverse rotation of the bottle 4 relatively to the body 1 is possible. The bolt 46 is normally urged by a compression spring 49 into the unlocked position, excess outward movement of bolt 46 being prevented by the fixed cross pin 50 which is adapted to abut one end of a recess formed in the bolt 46. The spring 49 is accommodated in a counterbore 51 in which is slidable the head 52 of bolt 46.

The bolt 46 is automatically moved, against the opposition of spring 49, into the bottle locking position (see Figure 6) and retained in that position as the result of mounting the body 1 on a base or attachment bracket 53. The bracket 53 (see Figure 5) comprises a flat plate 54 for attachment to a wall or other suitable surface, said plate 54 having a pair of inwardly opening converging side channels 55 for engaging laterally projecting ribs 56 provided on opposite exterior faces of the housing 12 of body 1. The plate 54 is provided with a number of holes 57 to receive countersunk fixing screws 58, an inclined ramp 59 extending in from the upper edge of the plate 54 and a hole 60 to receive the projecting end 61 of a body locking bolt 62 mounted in a blind socket 63 in the body 1 in offset parallel relation to the bottle locking bolt 46. This body locking bolt 62 serves to lock the body 1 to the wall plate 54 and is provided with a number of closely set circumferential grooves 64 at about the middle of its length. A coiled compression spring 65 is interposed between the inner end of the blind socket 63 and the recessed rear end of bolt 62 so as normally to cause the end 61 of the bolt 62 to project through an opening in a closure disc 66 which is secured at the opening of socket 63 and which traps in the socket the spring-pressed bolt 62. In one side of the block 48 in the upper part of the housing 12 an apertured plug 67 is pressed into a recess so that the outer face of the plug 67 is flush with the side face of the housing 12, the plug 67 being secured in position by peening or other suitable mode of fixing which cannot be readily tampered with by unauthorized persons. The aperture 68 in the plug 67 is of star shape, the notches forming the star-shaped opening being accurately cut as regards number, dimensions and spacing. Through this star-shaped aperture 68 is adapted to be passed the shank 69 of a key 70 (see Figure 11), the cross sectional form of the key shank 69 being complementary to the aperture 68. When the key 70 has been properly inserted into a transverse tunnel 71 in the housing block 48 the cylindrical extremity 72 of the key 70 is journalled in a hole 73 in said block 48, the hole 73 being axially aligned with the aperture 68 of plug 67. The tunnel 71 "breaks" into the through hole 47 and socket 63 in which the bottle locking bolt 46 and the body locking bolt 62 respectively are slidably accommodated, so that if the correct key 70 is inserted the fluted body 69 thereof will mesh with the grooves 64 of the body locking bolt 62. By means of the correct key therefore the bolt 62 may be moved to retract the projecting bolt end 61 and thus permit the body 1 to be slid on to the bracket 53. When the key 70 is removed the bolt 62 is shot forward by the spring 65 so as to make locking engagement with the hole 60 in the wall plate 54. During the act of attaching the body 1 to the wall plate 54 a bevel face on bolt head 52 contacts the ramp 59 on wall plate 54 thereby moving the bottle locking bolt 46 against the resistance of spring 49, so as to project its outer end into a gap between two adjacent lugs 45 of the bottle neck 3 seated in the socket 5. The projecting rear edge 74 of the housing 12 overlaps the top and sides of the upper part of the wall plate 54 so that it is impossible for an unauthorised person to insert an implement behind the mounted body 1 for the purpose of tampering with the body locking bolt 62. The holes 57 in the wall plate 54 are so arranged that fixing screws (see Figure 6) which secure the plate 54 to a wall surface 75 are inaccessible when the body 1 is mounted on the wall plate 54.

The opposite ends 76 of each bottle neck lug 44 are made square with the surface of the bottle neck 3 so that any attempt made to remove the bottle 4 from the body 1 is foiled by a square end 76 of the lug 44 coming into contact with the inwardly projecting end of bolt 46.

By varying the number and form of the bottle neck lugs 44 and/or the socket lugs 45 it is possible to prevent a wrong bottle 4 being connected to the body 1. In the particular embodiment illustrated by the accompanying drawings the bottle neck lugs 44 are shown as inclined, but it will be readily understood that alternatively or additionally the socket lugs 45 may be inclined.

For the purpose of facilitating the flow of the paste or liquid to the body chamber 10 a vent pipe 77 is mounted on the boss 41 in the upper part of the body chamber 10 so that when a bottle 4 has been connected to the body 1 the vent pipe 77 extends into the bottle 4. The lower end of the vent pipe 77 fits in one limb of a right-angular passage 78 in the boss 41, the other limb of the passage 78 opening freely into the interior of the housing 12. The vent pipe 77 is preferably made removable to facilitate packing the dispenser for storage and transport purposes. On the outer extremity of the vent pipe 77 is fitted a rubber cap 79 which prevents paste or liquid entering the vent pipe 77 through the open top thereof or through a hole 80. The rubber cap 79 is initially made with the top part of the cap, that is, the portion which covers the extremity of the pipe 77 beyond the position of the hole 80, of a smaller diameter than that of the remainder of the cap, so that the smaller diameter portion must be stretched in order to fit over the pipe 77. The larger diameter portion of the cap 79 is not stretched as the result of being fitted over the pipe 77, so that air passing into the pipe 77 via the passage 78, can escape freely through the hole 80 into the interior of the larger diameter unstretched portion of the cap and thence into the bottle interior. Paste or liquid cannot, however, penetrate far enough into the cap 79 to permit it to pass through the hole 80 into the interior of the pipe 77.

When a bottle 4, which is preferably the container in which the paste or liquid is marketed, is to be connected to the apparatus, the normal closure is removed from the neck 3 of the bottle 4 and the body 1 of the apparatus is inverted so that the socket 2 thereof can be placed over the bottle 3. The body 1 is then partially rotated on the stationary bottle 4, or the body 1 and the bottle 4 are simultaneously turned in opposite directions, so as to engage the bottle lugs 44 with the socket lugs 45. The body 1 with the bottle 4 attached thereto can then be again inverted and attached to the wall bracket 53.

The act of attaching the body 1, carrying the inverted bottle 4, to the wall plate 54 effects locking of the bottle 4 to the body 1 by means of bolt 46 in the manner already described. The manner of locking the body 1 to the wall plate 54 by using a suitable key 70 to operate the bolt 62 has also been described.

When the apparatus is to be operated to dispense a quantity of the substance stored in the bottle 4, for instance, soap paste, the operating lever 15 is engaged by the hooked fingers of one hand and the lower end of the lever pulled forward. The piston rod 17, acting against the resistance of its spring 21, moves forward the cut-off closure 24 and the spider plate 26 of the piston assembly, thereby causing the closure 24 to close the central aperture of the ring 27, which thus traps within and in front of the piston assembly a charge of soap paste. A piston assembly such as that illustrated will be found to operate efficiently even though the soap paste may have crystallized, as it may do at low temperatures. Continued pulling of the operating lever 15 causes the closure 24 to urge forward the whole piston assembly including slidable ring 27, with the result that soap paste is pressed through outlet 29 into the interior of the nipple 31 held in the nozzle 34, thereby expanding the nipple 31 to open the slit-like discharge orifice 33 so that the soap paste can now be expelled through said orifice 33, the soap paste being received, if desired, in the upturned palm of the same hand as that by means of which the operating lever 15 is being pulled. It will be appreciated that up to the limit of its stroke when the maximum amount of soap paste is dispensed, the extent to which the piston rod 17 is moved determines the amount of soap paste dispensed. The maximum amount of soap paste dispensable in a single full-stroke movement of the piston is regulated in the embodiment described by adjusting the screw 22 on lever 15. The quantity of soap paste dispensed could also be preadjusted by varying the tension of the piston spring, the maximum swing of the operating lever, the relative position of the piston, the thickness of the cut-off closure or in any other suitable manner. In designing a dispenser of the construction illustrated it is important to proportion the operating lever 15 so that the forward limit of stroke of the piston assembly is reached when the lower end of the operating lever is at a distance of about one and a half inches from the discharge orifice in order to ensure that the dispensed charge of soap paste is delivered on to the fingers or in the palm of the upturned hand by which the lever 15 is being pulled.

When the pull of the operating lever 15 is relieved the piston spring 21 operates to move rearwardly the operating lever 15, the piston rod 17 with the cut-off closure 24 and a spider plate 26, which latter returns the ring 27 to its normal position. The return movement of the piston assembly relieves the pressure on the compressed mass of soap paste—the cylinder 5 is not completely emptied at each operation—and the rubber nipple 31 self-seals its discharge orifice 33. The nipple 31 and its nozzle 34 are made detachable and may be made interchangeable with other nipples having orifice-forming slits of various sizes. The inverted bottle 4 may be protected by placing over the bottle a suitable casing, which may have a depending tongue which is adapted to engage with and be locked to the wall plate. In this case the lugs 44 and 45 and the locking bolt 46 may be dispensed with. If such a bottle-enclosing casing is used it may be made so as to terminate at a distance above the body of the apparatus so that the neck of the bottle is visible beneath the casing. If the bottle 4 is made of glass it can readily be judged when the bottle will be emptied and replacement necessary.

We claim:

1. Apparatus for dispensing paste and liquid substances comprising a body portion provided with a cylindrical bore with which communicates a one-way discharge valve in the form of an elastic nipple having a self-sealing discharge orifice and said body portion being provided with a socket, a receptacle holding the substance to be dispensed inserted in said socket so as to feed the substance by gravity action into the interior of the body, said receptacle having circumferentially spaced relatively inclined lugs around the periphery thereof, said socket having inclined spaced lugs around the opening thereof for coaction with said lugs on said receptacle, lock means in said body portion for locking said receptacle thereto, said lock means comprising an adjustable member extending into said socket in proximity to said lugs on said receptacle, said member abutting against said lugs and preventing rotation of said receptacle, a combined piston and one-way inlet valve slidable within said cylindrical bore of the body and adapted in one direction of its stroke to propel substance trapped on one side of the piston toward and expel a predetermined amount thereof through the discharge orifice which is opened solely by reason of pressure exerted through the substance being propelled, said one-way inlet valve preventing return of the fed substance to the receptacle when the combined piston and inlet valve is moved in the substance-expelling direction, and an exteriorly-operable-swingable lever for imparting movement to said piston to effect delivery of a predetermined quantity of the substance, said lever projecting below the body portion in line with the discharge orifice.

2. Apparatus according to claim 1, and including spring means holding the piston normally in the inoperative position and adjustable means associated with the swingable lever for altering the stroke of the piston.

3. Apparatus for dispensing paste and liquid substances comprising a supporting bracket, a chambered body detachably mounted on said bracket and provided on its underside with a one-way discharge valve having a self-sealing discharge orifice and with a circular socket having therein circumferentially spaced abutments adapted to engage complementary abutments on the circular neck of a marketing container holding the substance to be dispensed, said container being mountable in an inverted position so as to feed the substance by gravity action into the chamber of the body, a combined piston and inlet valve slidable within said body chamber and adapted in one direction of its stroke to propel substance trapped on one side of the piston toward and expel a predetermined amount thereof through the discharge orifice which is opened solely by reason of pressure exerted through the substance being propelled, said one-way inlet valve preventing return of the fed substance to the container when the combined piston and inlet valve is moved in the substance-expelling direction, said body having an opening therein in proximity to said bracket, said bracket having a hole therein opening into said opening in said body, a slidable member inserted in said opening in said body, said body having a portion thereof adapted for insertion in said hole in said bracket, spring means normally biasing said slidable member toward said bracket and forcing said portion of said member into said hole in said bracket, said slidable member comprising lock means for securing said body to said bracket, said slidable member having spaced circumferential grooves intermediate the ends thereof, an opening through a side of said body and adapted for the insertion therein of a key for coaction with said circumferential grooves to retract said slidable member and remove said portion from said hole in said bracket, second lock means having an element engaging the container abutments to secure said container to said body, said bracket covering said second lock means in assembled condition and preventing movement thereof until said first lock means has been released for disassembly, and adjustable operating means for imparting a movement to said piston to effect delivery of a predetermined quantity of the substance through the self-sealing orifice of the discharge valve, said operating means including a lever projecting below the body in line with the discharge orifice.

4. Apparatus for dispensing soap paste and the like, comprising a mounting bracket, a body portion having a self-sealing discharge orifice in the underside thereof, said body portion being formed for attachment to said bracket, substance-dispensing means within said body portion, a receptacle for holding the substance to be dispensed, said receptacle being detachably mounted on said body portion, a lever for operating said substance-dispensing means, said lever projecting below said body portion in line with the discharge orifice, and two interengaging locks carried by said body portion, a first lock for securing said body portion to said mounting bracket and a second lock for securing said receptacle to said body portion, said second lock being covered by said mounting bracket in assembled relationship and releasable only when said body portion has been detached from said mounting bracket following release of said first lock.

5. Apparatus for dispensing soap paste and the like, comprising a body portion, substance-dispensing means housed in said body portion, a discharge orifice in the underside of the body portion, a receptacle for holding the substance to be dispensed, said receptacle being detachably mounted on the body, an air vent tube mounted on the body portion extending into the substance-storing receptacle mounted on said body, a valve element on said tube adapted to allow air to pass into the receptacle to facilitate feeding of the substance into the chamber body but prevent escape of the substance through the tube, a lever operatively connected to the dispensing means for actuation thereof, said lever projecting below the body portion in line with the discharge orifice, and adjustable stop means connected to said lever and coacting with said body to limit movement of said lever in one direction for varying the amount of soap paste introduced in said dispensing means and consequently dispensed therefrom.

6. Apparatus for dispensing soap paste and the like comprising a body portion, said body portion comprising a chambered body, a socket in said body, a receptacle for holding the substance to be dispensed, said receptacle being detachably mounted on the body and the open end of said receptacle being mounted in said socket in said body so as to feed the substance by gravity action into the chamber of the body, substance dispensing means mounted in said chambered body including a ring member slidably mounted in said chambered body, a piston slidable in said body chamber, said piston and said ring coacting and jointly constituting a one-way inlet valve, a one-way discharge valve having a self-sealing discharge orifice connected to said body chamber, a lever operatively connected to said dispensing means for actuation thereof, said lever projecting below the body portion in line with the discharge orifice, adjustable stop means connected to said lever and coacting with said body to limit movement of said lever in one direction for predetermining the amount of soap paste introduced in said dispensing means and consequently dispensed therefrom, said piston within said body chamber upon movement by said lever being adapted in one direction of its stroke to close the opening through said ring and propel substance trapped on one side of the piston and in the ring opening toward and expel the predetermined amount thereof through the discharge orifice opened solely by reason of pressure exerted through the substance being propelled, said piston and said ring cooperating to form said one-way inlet valve preventing return of the fed substance to the receptacle when the piston is moved in the substance-expelling direction.

HENRY WINSTON SPENCER CHURCHILL.
CECIL STRATHMORE SCHOFIELD.

REFERENCES CITED

The following references are of record in the file of this patent:

UNITED STATES PATENTS

| Number | Name | Date |
| --- | --- | --- |
| 517,305 | Schleieter et al. | Mar. 27, 1894 |
| 875,228 | Withain | Dec. 31, 1907 |
| 973,006 | Phillips | Oct. 18, 1910 |
| 1,116,613 | Nyborg | Nov. 10, 1914 |
| 1,159,605 | Sprague | Nov. 9, 1915 |
| 1,184,878 | Rosenstock | May 30, 1916 |
| 1,326,880 | Rose | Dec. 30, 1919 |
| 1,455,970 | Resek | May 22, 1923 |
| 1,647,245 | Morrill | Nov. 1, 1927 |
| 1,910,032 | Mills | May 23, 1933 |
| 2,190,459 | Schnebelen | Feb. 19, 1940 |
| 2,319,233 | Hoppe | May 18, 1943 |
| 2,344,556 | Manley | Mar. 21, 1944 |
| 2,464,030 | Engstrom | Mar. 8, 1949 |
| 2,466,899 | Kingaid | Apr. 12, 1949 |